United States Patent [19]

Tardif

[11] Patent Number: 5,423,452
[45] Date of Patent: Jun. 13, 1995

[54] MIXING BOWL

[75] Inventor: Pierre Tardif, Longueuil, Canada

[73] Assignee: Genin Trudeau & Co., Limited, Boucherville, Canada

[21] Appl. No.: 178,083

[22] Filed: Jan. 6, 1994

[51] Int. Cl.⁶ .............................................. B65D 8/04
[52] U.S. Cl. .................................. 220/574; 220/631; 220/608; 220/672
[58] Field of Search ............... 220/606, 631, 608, 633, 220/635, 574, 673, 672

[56] References Cited

U.S. PATENT DOCUMENTS

| 1,268,583 | 6/1918 | Knox . | |
|---|---|---|---|
| 2,178,274 | 10/1939 | Ratner | 220/606 |
| 3,043,461 | 7/1962 | Glassco | 220/606 |
| 4,228,911 | 10/1980 | Hammes | 220/606 |
| 4,264,017 | 4/1981 | Karas et al. | 220/600 |
| 4,880,129 | 11/1989 | McHenry et al. | 220/606 |
| 5,169,023 | 12/1992 | Heiberg et al. | 220/57 X |

FOREIGN PATENT DOCUMENTS 1294785  1/1982  France .

Primary Examiner—Joseph Man-Fu Moy
Attorney, Agent, or Firm—Ladas & Parry

[57] ABSTRACT

An open top mixing bowl of generally semi-spherical form having hand grip means extending from its upper rim opposite a wide pouring spout and a plurality of concentric axially spaced anti-skid rings projecting outwardly of the lower exterior of the bowl to provide stable support to the bowl in its normal upright and tilted positions of operation.

7 Claims, 3 Drawing Sheets

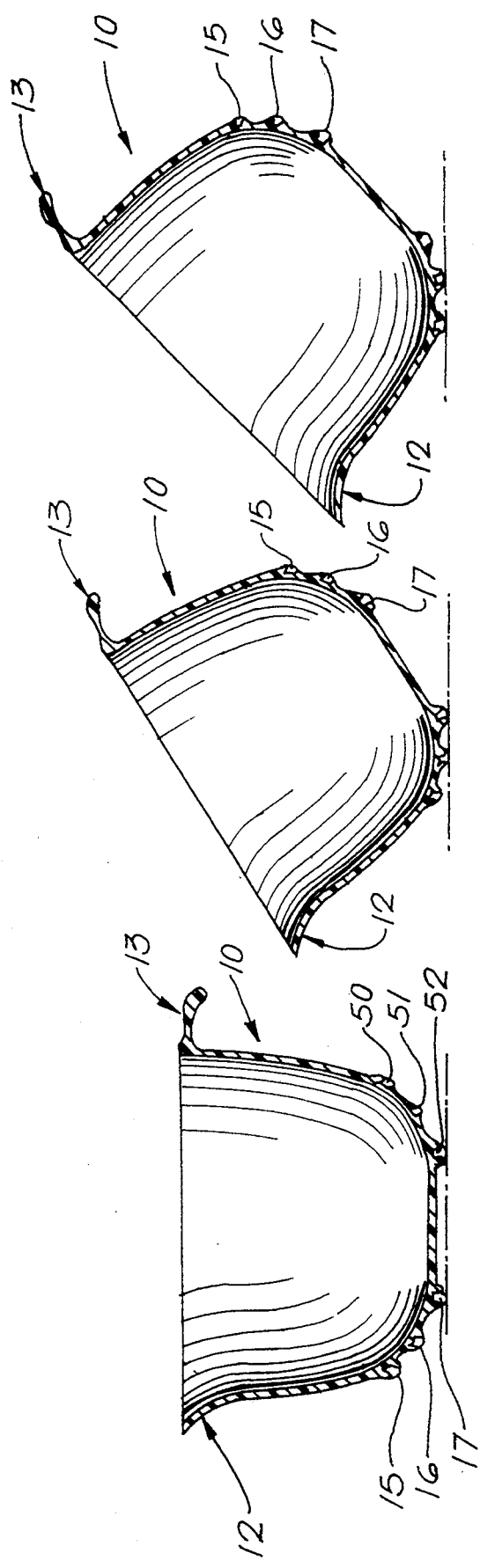

MIXING BOWL

This invention is directed to mixing bowls and more particularly to improved means for stabilizing such bowls in multiple operational positions.

BACKGROUND OF THE INVENTION

Mixing bowls are commonly used in a normal mixing position in which the bowl rests on a flat base and the central axis of the bowl is vertical. When it is desired to stir the bowl's ingredients, it is common practice to tilt the bowl slightly, so that a stirring instrument may be positioned to easily enter the open mouth of the bowl. If a more vigorous stirring or whipping action is desired the tilt of the bowl may be increased slightly to facilitate more vigorous stirring movement of the operator's wrist and hand.

Heretofore, the typical mixing bowl, shaped generally semi-spherical or nearly so, has been characterized by smooth outside walls and surfaces which provide minimal resistance to sliding or slipping movement of the bowl over an undersupporting surface. This is particularly emphasized in tilted bowl positions in which the bowl is clearly unstable, requiring the operator to grip and hold the bowl with one hand while manipulating the stirring tool with the other hand attempting to maintain the bowl stationary. Since the support of the bowl during these operations is carried out largely by holding the bowl's rim with one hand, bowl stability is not at its best.

BRIEF SUMMARY OF THE INVENTION

This invention is addressed to the foregoing outlined stability problem and presents a simple and effective solution thereto.

In brief, the improved bowl of this invention is featured by a plurality of concentric, axially spaced friction rings, protruding from the exterior of the bowl adjacent its lower end. These rings provide a stable anti-skid base for the bowl in its normal upright position, as well as anti-skid means for stabilizing the bowl in plural tilted positions of use. In addition, novel hand grip means extended from one side of the open mouth or upper periphery of the bowl to provide a firm gripping surface for all normal bowl operating positions. A widened pouring spout is provided opposite the hand grip means to allow free flow of thick and thin liquids from the bowl's interior without dripping over the rim and sides of the bowl. The hand grip means and spout are formed to permit easy concentric nesting of a series of graduated diameter bowls.

It is an important object of this invention to provide an improved mixing bowl having external anti-skid means to provide stability to the bowl when used in upright or tilted positions.

It is another object of this invention to provide a mixing bowl having improved, manual gripping means extending from the rim of the bowl.

It is a further object of this invention to provide an improved mixing bowl having a wide pouring spout capable of transmitting liquids from the bowl while avoiding unwanted dripping thereof over the sides of the bowl.

A still further important object of this invention is to provide a mixing bowl structure having the features set out in the preceding objectives and which is capable of being nested with additional like bowls of graduated diameter.

Having described this invention, the above and further objects features and advantages thereof will be recognized from the following detailed description of a preferred embodiment thereof, illustrated in the accompanying drawings and representative of the best mode currently contemplated for enabling those skilled in the art to practice this invention.

IN THE DRAWINGS

FIGS. 5-7 are a series of cross sectional views, similar to FIG. 4, but at a reduced scale therefrom, shown the bowl hereof in its normal upright and tilted positions for mixing, stirring and whipping operations, respectively.

DESCRIPTION OF PREFERRED EMBODIMENT

Figure 1:
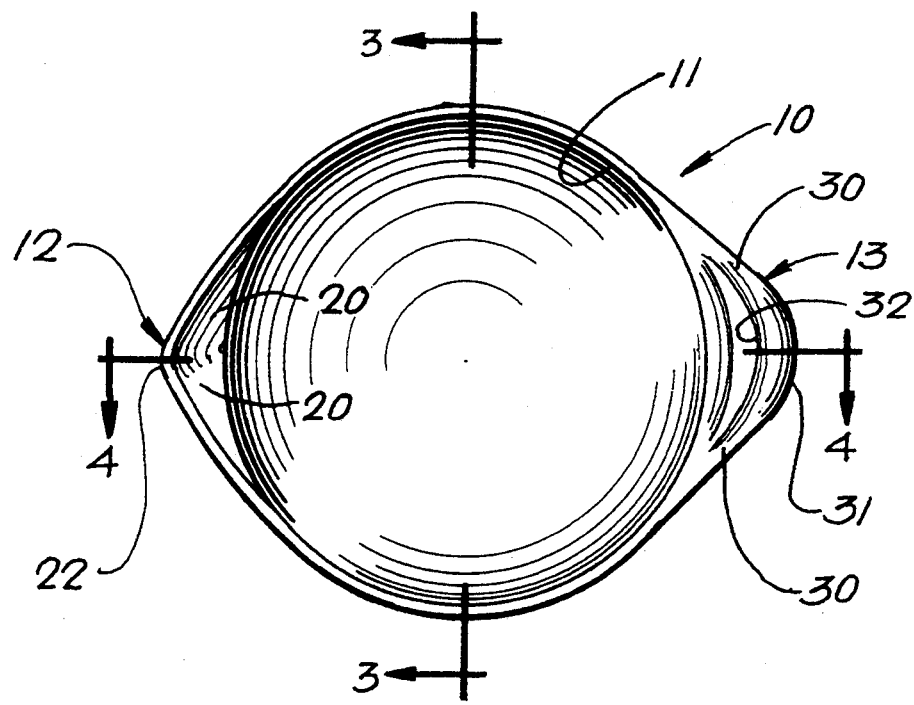
FIG. 1 is a top plan view of a mixing bowl according to this invention.

Turning now to the preferred embodiment of this invention illustrated in the drawings, initial reference is made to FIGS. 1-4 in relation to the following detailed description.

Figure 2:
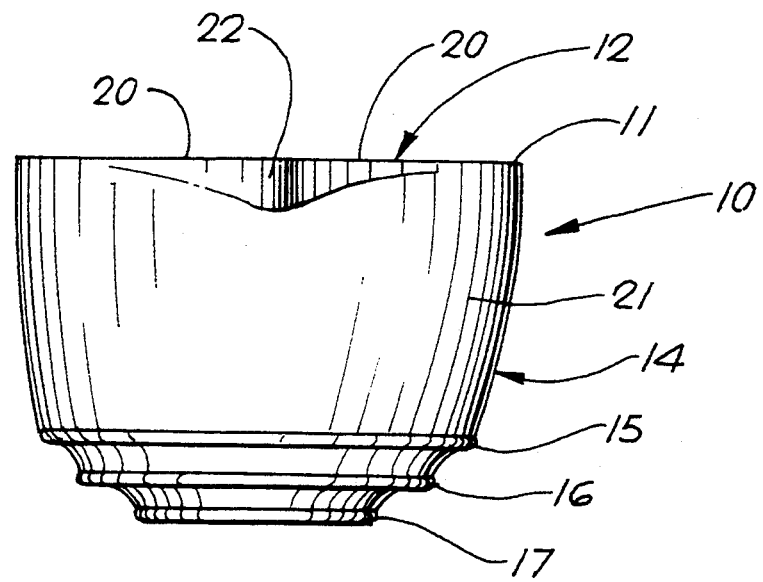
FIG. 2 is a left hand side elevational view thereof.

As shown in FIGS. 1 and 2 in particular, a mixing bowl 10 of this invention is formed as a generally semispherical vessel having a circular open mouth defined by a peripheral lip 11 at its upper end to afford free access to the bowl's smooth walled interior.

A wide pouring spout 12 extends from one side of lip 11 diametrically opposite a manually engageable handle or hand grip 13. Both the lip 12 and grip 13 extend radially outwardly of the bowl's upper peripheral lip 11.

Figure 4:
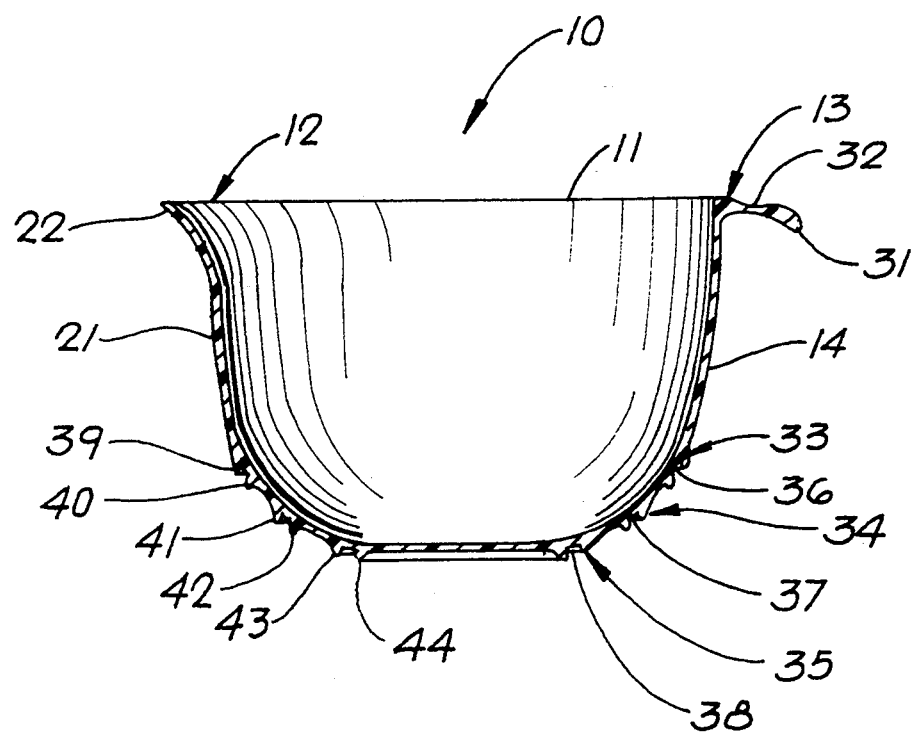
FIG. 4 is another cross-sectional view thereof taken substantially along vantage line 4—4 of FIG. 1 and looking in the direction of the arrows thereon.

As shown best in FIG. 2, the curvilinear side walls of the bowl's body 14 are distinguished by a plurality of concentric, axially spaced, annular, friction or anti-skid rings 15, 16 and 17 which protrude radially outwardly of the lower regions of the body 14 (see FIG. 4). Importantly the smallest ring 17 surrounds the bottom of bowl and provides a circular anti-friction, support engaging base for maintaining the bowl in a stable upright state, i.e., with its central axis vertical, as shown.

Bowl 10 preferably is formed by molding suitable plastic material, such as melamine-formaldehyde-polymer or melamine-phenol-formaldehyde-polymer, to provide a unitary, rigid, heat resistant bowl structure in which the pouring spout 12, hand grip 13 and means for mounting rings 15-17 are integral.

Turning to the particulars of pouring spout 12, it will be noted from FIGS. 1, 2 and 4 that the same is symmetrically formed about a diametrical center line of the bowl which is common to the bowl grip 13. In particular, two generally triangular wall portions 20, 20 extend tangentially outward from lip 11 and side wall 21 which forms the bowl's semi-spherical body 14 to generally merge with one another in a rounded spectual nose portion 22, radially outwardly of the bowl's peripheral lip 11 (see FIG. 1). Such wall portions 20, 20 also slope angularly downwardly to merge at their lower ends with an upper region of the bowl wall 21. This wide formation of the pouring spout accommodates liquids of varying viscosity to substantially prevent unwanted dripping and overrunning to the bowl's exterior.

The hand grip 13, as best shown in FIGS. 1 and 4, like spout 12, is molded integrally with the bowl wall 21 to extend radially outwardly from the bowl's upper rim 11. As noted heretofore, grip 13 is diametrically opposite pouring spout 12. More specifically, it will be noted that grip 13 comprises a pair of symmetrically related wall portions 30, 30 of general triangular formation which extends tangentially from lip 11 and merge into a radiused outer end portion 31 outwardly of the bowl body 14. The wall portions and end portion are separated by an indentation 32 in the upper surface of the wall portions 30 to extend transversely of the grip's center line for receiving the user's thumb over the top of grip 13. The outer end of the radiused portion 31 is thicker than the wall portions 30 and depends slightly from the general formational plane of such portions 30 (see FIG. 4). With this arrangement the user's thumb and fingers may securely and comfortably clamp the grip 13 therebetween when grasping the bowl.

Figure 3:
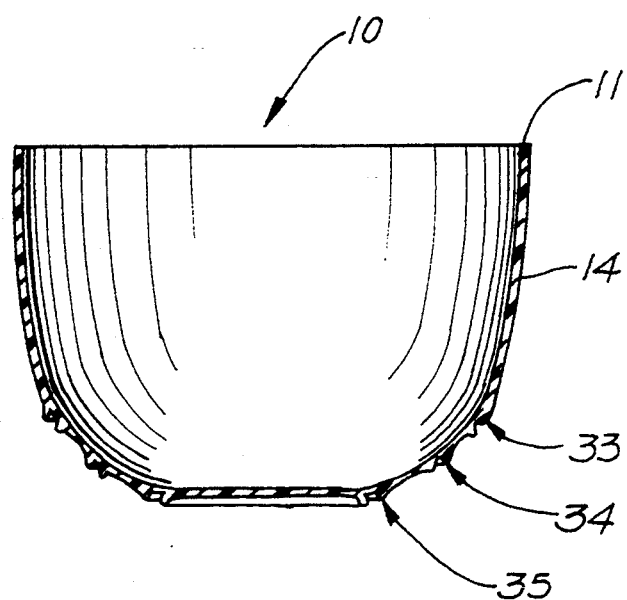
FIG. 3 is a transverse cross-sectional view thereof taken substantially along vantage line 3—3 of FIG. 1 and looking in the direction of the arrows thereon.

About the lower exterior regions of the bowls wall 21, three concentric, axially spaced, annular or circular locking channels 33, 34 and 35 are formed (see FIG. 3). Each channel comprises a generally rectangular central annular recess 36, 37 and 38, respectively, which are bordered at their axially upper and lower edges by pairs of cooperating, concentric, depending annular rims 39, 40; 41, 42; 43 and 44 which generally parallel the bowl's vertical axis (see FIG. 4). It will be noted that the bottom recess 38 is somewhat wider than the two recesses 36 and 37 for receiving the bottom or base ring 17.

As best illustrated in FIGS. 2 and 5-7, the several recesses receive mating annular, extensions or stems 50, 51 and 52 of the respectively related anti-skid rings 15, 16 and 17, such extensions being compressed between the annular rims 39-43 of the associated locking channels whereby to fix the rings in place about the bowl's exterior. In this respect it will be recognized from FIG. 2 that each of the rings 15-17 has a rounded outer end to provide a non-marring exterior surface for engaging a table top, counter top or other bowl supporting surface.

In practice, the anti-skid rings preferable are molded as integral annular members of suitable elastomeric, non-skid material. Typically polyvinylchloride or polyethylene terephthalate, capable of withstanding repeated washing at elevated temperatures without deteriorating may be employed for this purpose.

With reference to FIGS. 5-7, it will be recognized that in the normal upright mixing position of bowl 10, the bottom most ring 17 engages a support surface to provide a stable stance to the bowl. As shown in FIG. 5, when it is desired to stir the bowl's ingredients, while tilting the bowl, the position illustrated in FIG. 6 is normally resorted to, wherein the user engages the hand grip 13 while stirring the bowl's ingredients with a spoon or other instrument. It will be noted that bowl stability in this tilted altitude is gained by both rings 16 and 17 engaging a support surface.

For whipping activity of the bowl's ingredients, the high tilt position of the bowl, indicated in FIG. 7, is used. In this attitude, both anti-skid rings 15 and 16 operate to provide the necessary engagement stability with a support surface.

While that illustrated, it is apparent that a series of bowls 16, made with graduated diameters may be concentrically nested to facilitate storage according to familiar practice.

From the foregoing it is believed that those familiar with the art will recognize the novel advancement of this invention over the prior art and will understand that while such has hereinabove been described in relation to a particular preferred embodiment thereof illustrated in the accompanying drawings, the same is susceptible to modification variation and substitution of equivalents without departing from the spirit and scope of this invention which is intended to be unlimited except as appears in the following appended claims.

The embodiments of the invention in which an exclusive property or privilege is claimed are defined as follows:

1. A mixing bowl comprising a generally semi-spherical body forming an open top vessel having curvilinear side walls; a pouring spout extending radially outwardly of an upper rim of said body and comprising an integral extension of said sidewalls; hand grip means for manually engaging said bowl extending radially outwardly of said rim, diametrically opposite said spout; and a plurality of annular anti-friction rings of different diameters mounted in concentric, parallel, axially spaced relation about the lower exterior of said body and located upwardly along said side walls, said rings protruding outwardly of said side walls for frictionally engaging a support surface for the bowl at least one of said rings supporting the bowl in an upright position and every two adjacent ones of said rings supporting the bowl in one of two tilted operating positions.

2. The bowl of claim 1, wherein said side walls comprise a plurality of annular axial spaced, concentric locking channels formed in the lower exterior thereof; each channel having means receptive of a said anti-friction ring for fixing the same in place.

3. The bowl of claim 2, wherein said body, spout, grip and means for fixing said rings in place are integral parts of a unitary molded member.

4. The bowl of claim 3, wherein said molding is formed of melamine plastic.

5. The bowl of claim 2, wherein each of said rings is an elastomeric, annular member having an annular axial extension adapted to be insertably compressed in one of said locking channels.

6. The bowl of claim 5, wherein said rings are formed of polyvinylchloride.

7. The bowl of claim 1, wherein said hand grip means comprises a pair of generally triangular shaped wall portions extending tangentially outwardly of said upper rim and having a transverse indentation across the upper surfaces thereof for receiving a user's thumb.

* * * * *